(12) United States Patent
Nam et al.

(10) Patent No.: US 11,722,988 B2
(45) Date of Patent: Aug. 8, 2023

(54) POWER EFFICIENT PAGING ACROSS PAGING OCCASIONS

(71) Applicant: QUALCOMM Incorporated, San Diego, CA (US)

(72) Inventors: Wooseok Nam, San Diego, CA (US); Tao Luo, San Diego, CA (US); Juan Montojo, San Diego, CA (US); Peter Gaal, San Diego, CA (US); Wanshi Chen, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 17/303,797

(22) Filed: Jun. 8, 2021

(65) Prior Publication Data

US 2021/0385792 A1   Dec. 9, 2021

Related U.S. Application Data

(60) Provisional application No. 63/036,788, filed on Jun. 9, 2020.

(51) Int. Cl.
*H04W 68/02* (2009.01)
*H04W 56/00* (2009.01)
*H04W 68/00* (2009.01)

(52) U.S. Cl.
CPC ......... *H04W 68/02* (2013.01); *H04W 56/001* (2013.01); *H04W 68/005* (2013.01)

(58) Field of Classification Search
CPC . H04W 68/02; H04W 56/001; H04W 68/005; H04W 68/025; Y02D 30/70
(Continued)

(56) References Cited

U.S. PATENT DOCUMENTS

2009/0040955 A1* 2/2009 Jung ................. H04W 52/0216
370/342
2016/0286487 A1* 9/2016 Sachs ................ H04W 52/0216
(Continued)

FOREIGN PATENT DOCUMENTS

WO   WO-2018082653 A1 *  5/2018  ............ H04W 72/14
WO   WO-2018144873 A1    8/2018

OTHER PUBLICATIONS

3GPP TS 38.214: "3rd Generation Partnership Project; Technical Specification Group Radio Access Network; NR; Physical Layer Procedures for Data (Release 16)", 3GPP Draft, 38214-G10, 3GPP TS 38.214, 3rd Generation Partnership Project (3GPP), Mobile Competence Centre, 650, Route Des Lucioles, F-06921 Sophia-Antipolis Cedex, France, vol. RAN WG1. No. V16.1.0, Apr. 3, 2020 (Apr. 3, 2020), pp. 1-151, XP051893823, Retrieved from the Internet: URL: URL: https://ftp.3gpp.org/Specs/archive/38_series/38.214/38214-g10.zip 38214-g10.docx Draft38214-g10.docx [retrieved on Apr. 3, 2020], pp. 44-47, col. 5.1.6.5, Section 5.2. section 5.1.5, sections 5.2 to 5.2.1.6, section 5.2.2.4, section 5.2.5, clauses 5.1.5, 5.2.1, 5.2.2.3.1, 6-6.1.2.2.3, 6.2.1-6.3.2.
(Continued)

*Primary Examiner* — Inder P Mehra
(74) *Attorney, Agent, or Firm* — Harrity & Harrity, LLP

(57) ABSTRACT

Various aspects of the present disclosure generally relate to wireless communication. In some aspects, a user equipment may receive, in a first paging occasion, paging information that identifies a data transmission in a second paging occasion subsequent to the first paging occasion; and receive the data transmission during the second paging occasion. Numerous other aspects are provided.

35 Claims, 7 Drawing Sheets

400 ⟶

(58) Field of Classification Search
USPC .......................................................... 370/329
See application file for complete search history.

(56) References Cited

U.S. PATENT DOCUMENTS

| 2019/0223160 A1* | 7/2019 | He | H04L 5/0053 |
|---|---|---|---|
| 2019/0357303 A1* | 11/2019 | Xiong | H04B 7/088 |
| 2021/0153162 A1* | 5/2021 | Chen | H04W 72/042 |

OTHER PUBLICATIONS

"3rd Generation Partnership Project, Technical Specification Group Radio Access Network, NR, Study on UE Power Saving (Release 16)", 3GPP Draft, R2-1903118, 3GPP TR 38.840, V1.0.0, (Mar. 2019), Mar. 31, 2019 (Mar. 31, 2019), 3rd Generation Partnership Project (3GPP), Mobile Competence Centre, 650, Route Des Lucioles, F-06921 Sophia-Antipolis Cedex, France, vol. RAN WG2, Mar. 29, 2019, XP051692396, Retrieved from the Internet: URL: http://www.3gpp.org/ftp/tsg%5Fran/WG2%5FRL2/TSGR2%5F105bis/Docs/R2%2D1903118%2Ezip. [Retrieved on Mar. 29, 2019], 69 pages, The whole document. Clauses 5.2.1-5.2.2 an 6.1.

Ericsson: "Cross-Slot Scheduling for UE Power Saving in Paging", 3GPP Draft, 3GPP TSG-RAN WG1 Meeting #97, R1-1907328, Cross-Slot Scheduling for UE Power Saving in Paging, 3rd Generation Partnership Project (3GPP), Mobile Competence Centre, 650, Route Des Lucioles, F-06921 Sophia-Antipolis Ced, vol. RAN WG1, Reno, USA, May 13, 2019-May 17, 2019, May 13, 2019, XP051728767, 4 Pages, Retrieved from the Internet: URL: http://www.3gpp.org/ftp/Meetings%5F3GPP%5FSYNC/RAN1/Docs/R1%2D1907328%2Ezip. [Retrieved on May 13, 2019], Section 2.2.

International Search Report and Written Opinion—PCT/US2021/070679—ISA/EPO—dated Sep. 24, 2021.

ZTE: "On Adaptation Aspects for NR UE Power Consumption Reduction", 3GPP Draft, 3GPP TSG RAN WG1 Ad-Hoc Meeting 1901, R1-1900226, On Adaptation Aspects for NR UE Power Consumption Reduction-Final, 3rd Generation Partnership Project (3GPP), Mobile Competence Centre, 650, Route Des Lucioles, F-06921, Sophia, vol. RAN WG1, No. Taipei, Jan. 21, 2019-Jan. 25, 2019, Jan. 20, 2019 (Jan. 20, 2019), XP051593148, 13 Pages, Retrieved from the Internet: URL: http://www.3gpp.org/ftp/Meetings%5F3GPP%5FSYNC/RAN1/Docs/R1%2D1900226%2Ezip. [Retrieved on Jan. 20, 2019] sections 3.1-3.1.2.

* cited by examiner

POWER EFFICIENT PAGING ACROSS PAGING OCCASIONS

CROSS-REFERENCE TO RELATED APPLICATION

This Patent Application claims priority to U.S. Provisional Patent Application No. 63/036,788, filed on Jun. 9, 2020, entitled "POWER EFFICIENT PAGING ACROSS PAGING OCCASIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for power efficient paging across paging occasions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving, in a first paging occasion, paging information that identifies a data transmission in a second paging occasion subsequent to the first paging occasion; and receiving the data transmission during the second paging occasion.

In some aspects, a method of wireless communication, performed by a base station, may include transmitting, to a UE, in a first paging occasion, paging information that identifies a data transmission in a second paging occasion subsequent to the first paging occasion; and transmitting the data transmission in the second paging occasion.

In some aspects, a user equipment for wireless communication may include a memory and one or more processors coupled to the memory. The memory and the one or more processors may be configured to receive, in a first paging occasion, paging information that identifies a data transmission in a second paging occasion subsequent to the first paging occasion; and receive the data transmission during the second paging occasion.

In some aspects, a base station for wireless communication may include a memory and one or more processors coupled to the memory. The memory and the one or more processors may be configured to transmit, to a UE, in a first paging occasion, paging information that identifies a data transmission in a second paging occasion subsequent to the first paging occasion; and transmit the data transmission in the second paging occasion.

In some aspects, a non-transitory computer-readable medium may store one or more instructions for wireless communication. The one or more instructions, when executed by one or more processors of a UE, may cause the one or more processors to receive, in a first paging occasion, paging information that identifies a data transmission in a second paging occasion subsequent to the first paging occasion; and receive the data transmission during the second paging occasion.

In some aspects, a non-transitory computer-readable medium may store one or more instructions for wireless communication. The one or more instructions, when executed by one or more processors of a base station, may cause the one or more processors to transmit, to a UE, in a first paging occasion, paging information that identifies a data transmission in a second paging occasion subsequent to the first paging occasion; and transmit the data transmission in the second paging occasion.

In some aspects, an apparatus for wireless communication may include means for receiving, in a first paging occasion, paging information that identifies a data transmission in a second paging occasion subsequent to the first paging occasion; and means for receiving the data transmission during the second paging occasion.

In some aspects, an apparatus for wireless communication may include means for transmitting, to a UE, in a first paging occasion, paging information that identifies a data transmission in a second paging occasion subsequent to the first paging occasion; and means for transmitting the data transmission in the second paging occasion.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
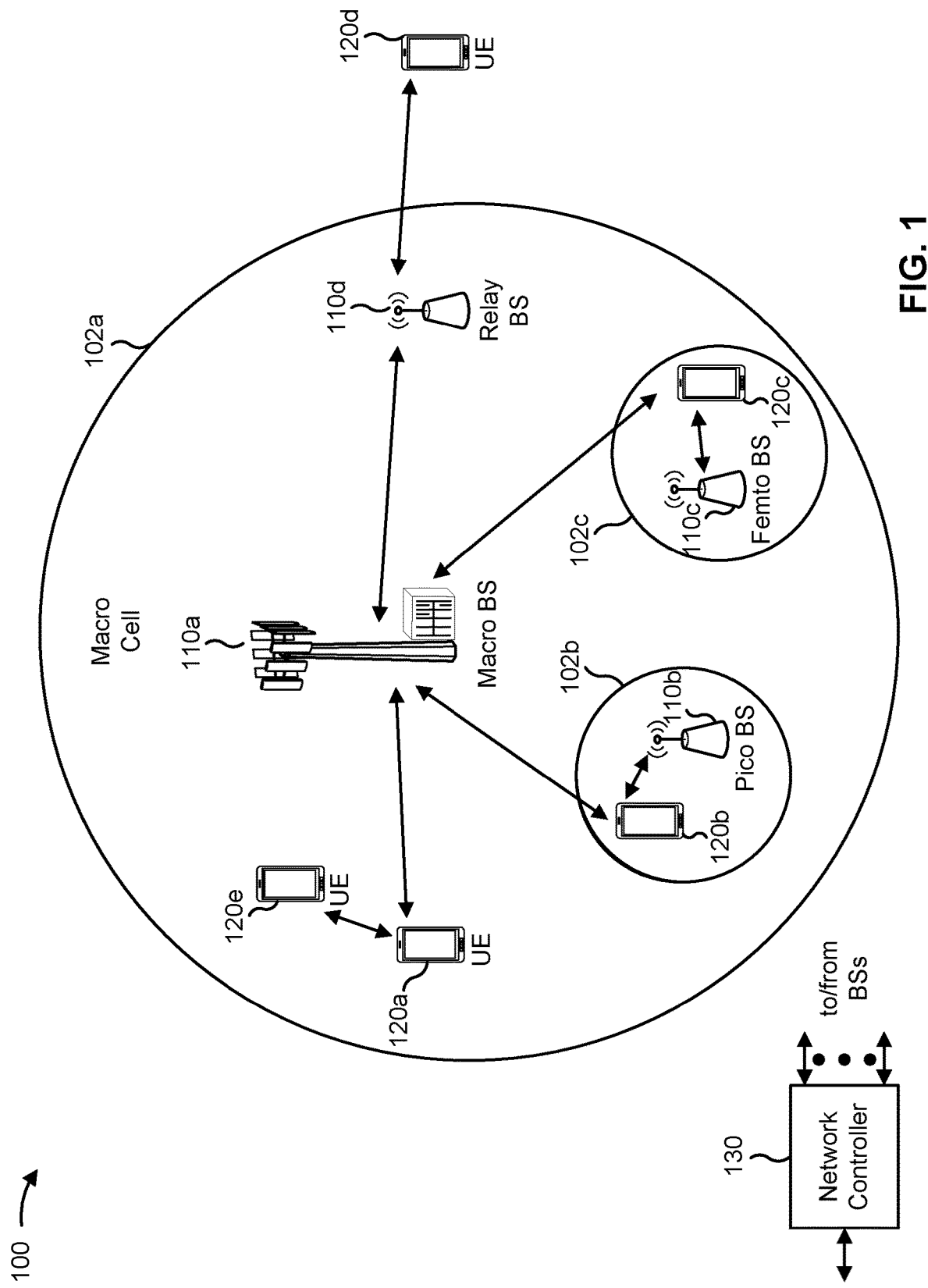
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
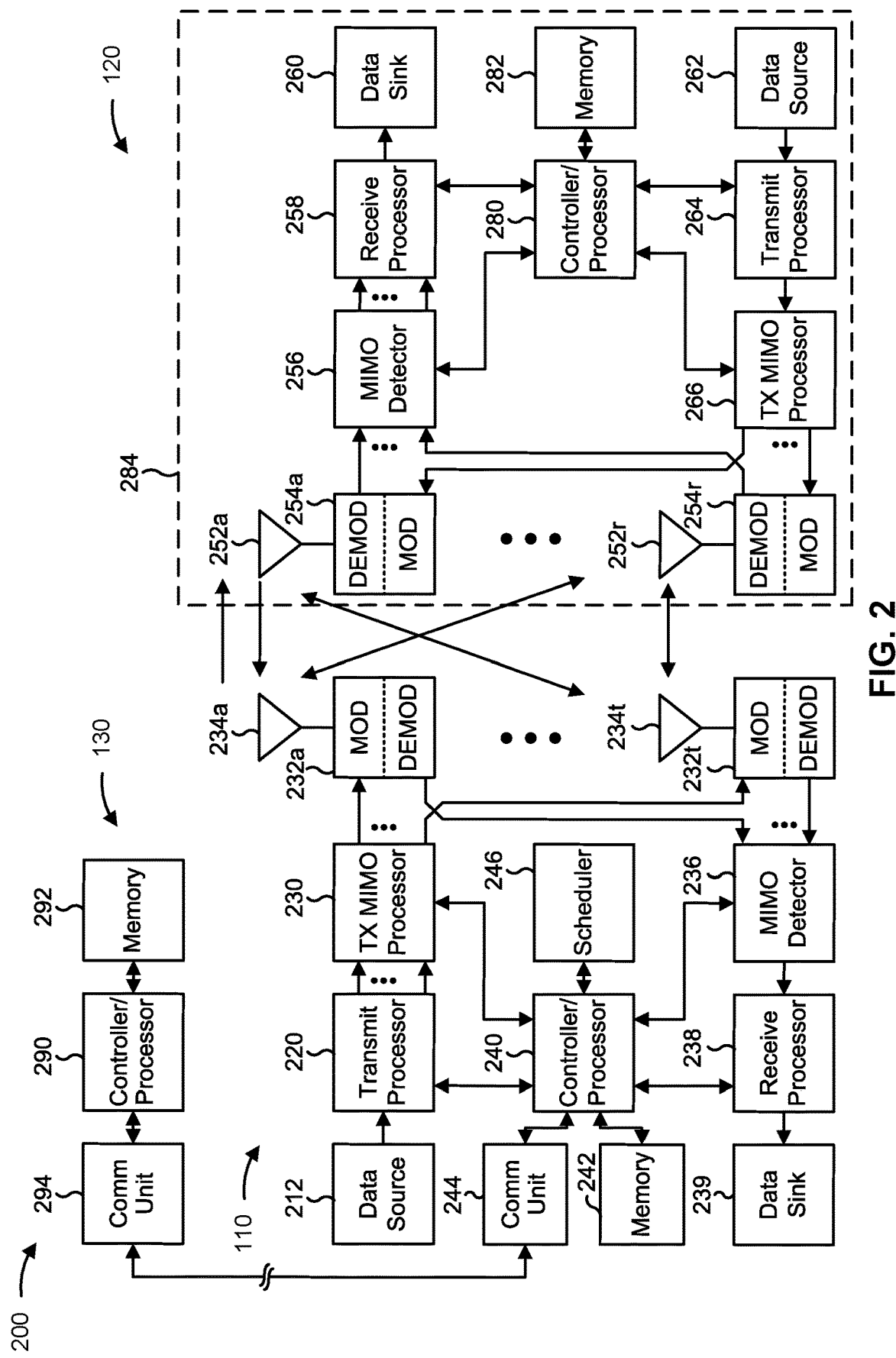
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-5).

Controller/processor 240 of base station 110, controller/processor 280 of UE 120, and/or any other component(s) of FIG. 2 may perform one or more techniques associated with paging occasion (PO) sharing and cross-PO paging, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, UE 120 may include means for receiving, in a first paging occasion, paging information that identifies a data transmission in a second paging occasion subsequent to the first paging occasion; means for receiving the data transmission during the second paging occasion; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, in a first paging occasion, paging information that identifies a data transmission in a second paging occasion subsequent to the first paging occasion; means for transmitting the data transmission in the second paging occasion; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may enter an idle mode (e.g., an LTE or NR radio resource control (RRC) idle mode) or an inactive mode (e.g., an NR RRC inactive mode) in which the UE uses a low power configuration. The UE may enter an inactive mode from a connected mode (such as an RRC connected mode) based at least in part on an RRC release message. In the idle mode, the UE may perform certain monitoring operations, registration area updating, UE controlled mobility, and so on. In the low power configuration, the UE may power down some communication components and may cease monitoring of a data channel (e.g., a physical downlink shared channel (PDSCH)).

If a base station is to transmit a data transmission to a UE in an idle or inactive (idle/inactive or inactive/idle) mode, the base station may page the UE so that the UE monitors a data channel for the data transmission. For example, the base station may transmit, to the UE in a physical downlink control channel (PDCCH), downlink control information (DCI) with a cyclic redundancy check (CRC) scrambled using a paging radio network temporary identifier (P-RNTI). The P-RNTI may be common for all UEs covered by the base station, and a corresponding data transmission (e.g., PDSCH, paging message) may include information indicating an identity of the paged UE.

The transmission of the DCI may occur in a paging occasion (PO), which may be defined by a discontinuous reception (DRX) pattern. A PO may include a number of consecutive PDCCH monitoring occasions (MOs) based at least in part on a paging search space set. In some aspects, a PO may include multiple slots. Each PDCCH MO in a PO may have a one-to-one mapping with a synchronization signal block (SSB) based at least in part on a quasi-colocation (QCL) type. For example, a synchronization signal block may be a QCL Type A or Type D source for a PDCCH MO based at least in part on a configuration referred to as "ssb-PositionInBurst." This configuration may be provided in a system information block (SIB) such as SIB1. Starting from the first PDCCH MO in a paging frame, the starting point of the i-th PO may be determined by the i-th value of a configuration referred to as "firstPDCCH-MonitoringOccasionOfPO", which may also be provided in SIB1. The same paging message and the same short message may be repeated in all MOs in a PO.

In some aspects, a base station and/or a UE may perform cross-slot scheduling, if the UE supports cross-slot scheduling for paging message transmission. For example, a UE in an idle or inactive mode may buffer a received signal in a paging slot to capture a potential paging PDCCH. The UE may warm up sufficient hardware to decode the paging DCI in order to conserve power relative to entering a fully active mode. If a paging DCI is detected, the UE may warm up additional hardware for PDSCH decoding. The UE may receive and process the PDSCH (e.g., the paging message) in accordance with a scheduling offset (e.g., K0) that indicates a slot offset between the PDCCH and the PDSCH. If the UE does not support cross-slot scheduling for paging message transmission, the paging PDCCH and the PDSCH may be transmitted in the same slot. In these cases, the PDCCH and the PDSCH are in a same PO. A UE that supports cross-slot scheduling for paging transmissions may be referred to herein as a UE that supports cross-slot scheduling. Similarly, a UE that does not support cross-slot scheduling for paging messages may be referred to herein as a UE that does not support cross-slot scheduling.

In some cases, a first UE that supports cross-slot scheduling and a second UE that does not support cross-slot scheduling may share a same PO. A PDCCH for the first UE may be transmitted in slot N, scheduling a PDSCH in slot N+K0 of a PO, where K0 is the scheduling offset. The scheduling offset identifies a number of slots between receiving a PDCCH and receiving a PDSCH scheduled by the PDCCH. A PDCCH for the second UE may be transmitted in slot N+K0 of the PO, scheduling the PDSCH in slot N+K0. However, when a PO is used (e.g., when a paging message is transmitted in the PO), all PDCCH MOs and PDSCH occasions in the PO are occupied, since the same paging message and short message are repeated in all MOs in a PO. Therefore, it may be difficult or impossible to find space for additional PDCCH MOs for a UE that supports cross-slot scheduling in the PO, since the UE that does not support cross-slot scheduling has priority to use PDCCH MOs in the same slot in the PO (due to the goal of minimizing or avoiding impact on the operation of the UE that does not support cross-slot scheduling). This may lead to inefficient resource allocation and delay in paging of UEs that support cross-slot scheduling.

Some techniques and apparatuses described herein provide cross-PO scheduling for a UE that supports cross-slot scheduling. For example, a paging PDCCH may be transmitted outside of a PO that includes a PDSCH corresponding to the paging PDCCH. In some aspects, the paging PDCCH may be transmitted in another PO, such as a PO prior to the PO that includes the PDSCH. The PO that includes the PDSCH may also include a PDCCH for a UE that does not support cross-slot scheduling. Thus, a paging PDCCH is transmitted outside of a PO that includes the PDSCH, which simplifies coexistence of UEs that support cross-slot scheduling and UEs that do not support cross-slot scheduling. Thus, resource utilization is improved and efficiency of communication is improved. Furthermore, impacts on UEs that do not support cross-slot scheduling are minimized and/or avoided, and UEs that support cross-slot scheduling may save power.

Figure 3:
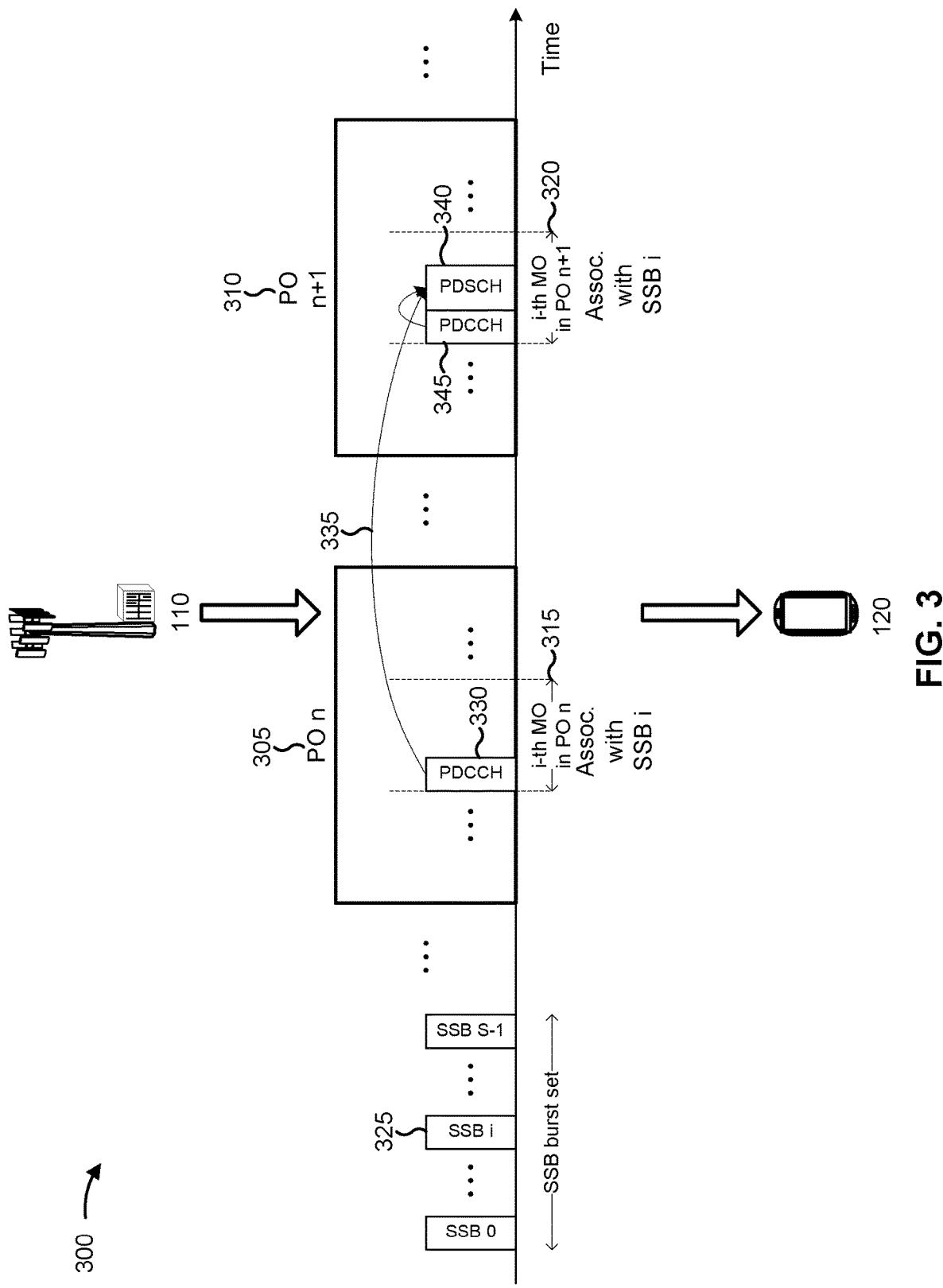
FIG. 3 is a diagram illustrating an example of cross-paging occasion (cross-PO) scheduling for an idle or inactive mode UE.

FIG. 3 is a diagram illustrating an example 300 of cross-PO scheduling for an idle/inactive mode UE. As shown, example 300 includes a BS 110 and a UE 120. The BS 110 may transmit the SSBs, PDCCHs, and PDSCH shown in FIG. 3, which is indicated by the arrows from the BS 110 toward the UE 120. In some aspects, the UE 120 may be capable of cross-slot scheduling for paging message transmission. In some aspects, the UE 120 may not be capable of cross-slot scheduling for paging message transmission (in which case the UE may be referred to as a legacy UE). The techniques and apparatuses described herein provide coexistence between UEs that support cross-slot scheduling and UEs that do not support cross-slot scheduling, by way of cross-PO paging operations for UEs that support cross-slot scheduling. In some aspects, a UE that supports cross-slot scheduling may be referred to as a UE that supports cross-PO paging, and a UE that does not support cross-slot scheduling may be referred to as a UE that is incapable of cross-PO paging.

An SSB (such as a synchronization signal/physical broadcast channel block) may include a primary synchronization signal (PSS), a secondary synchronization signal (SSS), and a physical broadcast channel (PBCH) which may include a demodulation reference signal. The PSS and the SSS may be used for synchronization The PBCH may carry a master information block (MIB).

Example 300 includes a first PO (PO n, shown by reference number 305) and a second PO (PO n+1, shown by reference number 310). In example 300, the first PO and the second PO are consecutive, though the first PO and the second PO do not need to be consecutive. In some aspects, the first PO and the second PO may be non-consecutive (e.g., may be separated by one or more POs). Consecutive POs may reduce paging latency, whereas non-consecutive POs may increase scheduling flexibility.

The first PO and the second PO may include MOs (e.g., PDCCH MOs). A PDCCH MO is a resource associated with an SSB in which the UE 120 monitors for a PDCCH associated with the SSB (e.g., transmitted using a beam defined by the SSB). An i-th MO in the first PO is shown by reference number 315, and an i-th MO in the second PO is shown by reference number 320. As shown, the i-th MO (in the first PO and in the second PO) may be associated with an SSB i, shown by reference number 325. For example, the i-th MOs may be associated with a same beam configuration (e.g., a same spatial parameter, a same QCL relationship configuration, a same transmission beam and/or a same associated SSB configuration). For example, the SSB may be a QCL source (e.g., for QCL Type A and/or QCL Type D) for the i-th MOs. Thus, the same SSB can be used as a QCL source for PDCCHs and PDSCHs in both POs.

As shown by reference number 330, the BS 110 may transmit a PDCCH in the first PO. As shown by reference number 335, the PDCCH may indicate a PDSCH (e.g., a paging message) in the second PO. The PDSCH in the second PO is shown by reference number 340. The UE 120 (e.g., the UE 120 capable of performing cross-slot scheduling) may receive the PDCCH shown by reference number 330, and may receive the PDSCH shown by reference number 340 based at least in part on the PDCCH shown by reference number 330. For example, the PDCCH shown by reference number 330 may indicate the time domain resource (e.g., starting symbol, length of symbols, and the slot offset from the PDCCH to the PDSCH shown by reference number 340). The indication of the time domain resource may be configured in a time-domain resource allocation table, and the PDCCH may indicate an index in the table. The PDCCH shown by reference number 330 may also indicate a frequency domain resource (e.g., a starting resource block (RB) index and number of RBs). For intra-slot paging (such as for the PDCCH shown by reference number 345), the UE 120 may use a default time-domain resource allocation table, within which, all the slot offset values are fixed to zero. This is why the paging PDCCH shown by reference number 345 and the PDSCH shown by reference number 340 are in the same slot. For cross-PO paging, for a UE 120 supporting cross-slot scheduling (e.g., across POs), the UE 120 may ignore the zero slot offset in the default time-domain resource allocation, and may assume a slot offset that amount to the distance between corresponding MOs (i.e., MO i shown by reference numbers 315 and 320) in two different POs.

In some aspects, the PDCCH shown by reference number 330 may not indicate a scheduling offset. For example, the PDCCH shown by reference number 330 may not explicitly indicate a K0 value, since the UE 120 can determine an offset between the PDCCH shown by reference number 330 and the PDSCH shown by reference number 340 based at least in part on configurations of the first PO and the second PO. Thus, communication resources that would otherwise be used to provide an explicit indication of a K0 value are conserved.

As shown by reference number 345, the BS 110 may transmit a PDCCH in the second PO. The PDCCH shown by reference number 330 and the PDCCH shown by reference number 345 may be referred to as paging information, or may carry paging information. For example, "paging information" may refer to information indicating a frequency domain resource and/or a time domain resource for the PDSCH. The PDCCH shown by reference number 345 may also indicate the PDSCH shown by reference number 340. For example, a UE 120 that is not capable of cross-slot scheduling may receive the PDCCH shown by reference number 345, and may accordingly receive the PDSCH shown by reference number 340. Thus, coexistence between UEs that are capable of cross-slot scheduling and legacy UEs is improved by way of cross-PO paging for UEs that are capable of cross-slot scheduling.

In some aspects, the BS 110 may transmit a signal based at least in part on a sequence or a reference signal in the first PO. For example, the BS 110 may transmit a time-domain sequence or a reference signal in the first PO and the PDCCH shown by reference number 345 in the second PO. In this way, the BS 110 may provide cross-slot paging while reducing overhead relative to transmitting the PDCCH shown by reference number 330.

As indicated above, FIG. 3 is provided as an example. Other examples may differ from what is provided with regard to FIG. 3.

Figure 4:
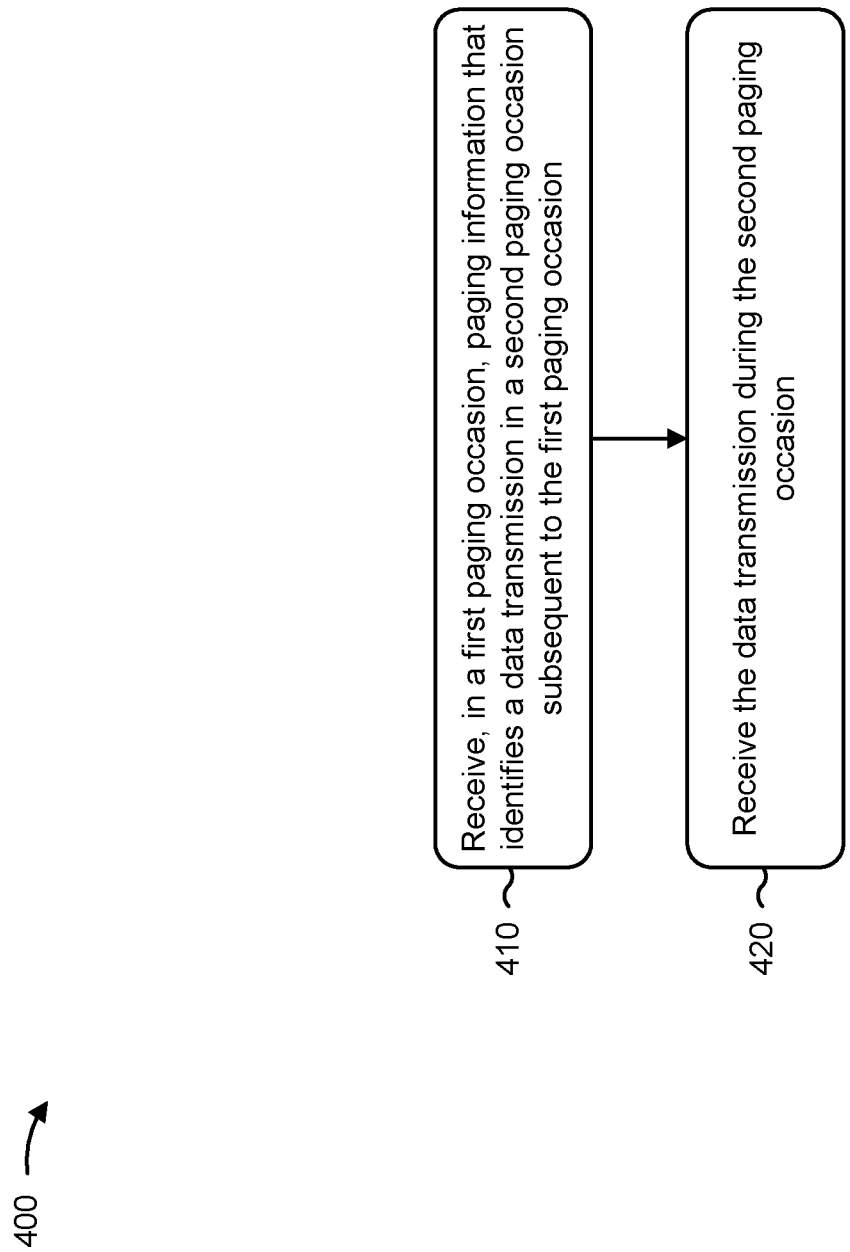
FIGS. 4-5 are diagrams illustrating example processes associated with PO sharing and cross-PO paging, in accordance with the present disclosure.

FIG. 4 is a diagram illustrating an example process 400 performed, for example, by a UE, in accordance with the present disclosure. Example process 400 is an example where the UE (e.g., UE 120, a UE capable of cross-slot scheduling and cross-PO paging, and/or the like) performs operations associated with PO sharing and cross-PO paging.

As shown in FIG. 4, in some aspects, process 400 may include receiving, in a first paging occasion, paging information that identifies a data transmission in a second paging occasion subsequent to the first paging occasion (block 410). For example, the UE (e.g., using antenna 252, DEMOD 254, MIMO detector 256, receive processor 258, controller/processor 280, and/or the like) may receive, in a first paging occasion, paging information that identifies a data transmission in a second paging occasion subsequent to the first paging occasion, as described above.

As further shown in FIG. 4, in some aspects, process 400 may include receiving the data transmission during the second paging occasion (block 420). For example, the UE (e.g., using antenna 252, DEMOD 254, MIMO detector 256, receive processor 258, controller/processor 280, and/or the like) may receive the data transmission during the second paging occasion, as described above. In some aspects, the UE may determine a resource for the data transmission based at least in part on the paging information and/or configurations of the first paging occasion and the second paging occasion.

Process 400 may include additional aspects, such as any single aspect or any combination of aspects described below and/or in connection with one or more other processes described elsewhere herein.

In a first aspect, the second paging occasion is consecutive with the first paging occasion in time.

In a second aspect, alone or in combination with the first aspect, the first paging occasion is shared by a first set of UEs incapable of cross-paging occasion paging, and the second paging occasion is shared by a second set of UEs incapable of cross-paging occasion paging.

In a third aspect, alone or in combination with one or more of the first and second aspects, a set of monitoring occasions in which the paging information is received, and a data channel occasion in which the data transmission is received, are associated with a same beam configuration.

In a fourth aspect, alone or in combination with one or more of the first through third aspects, the beam configuration comprises at least one of a synchronization signal block configuration or a quasi-colocation configuration.

In a fifth aspect, alone or in combination with one or more of the first through fourth aspects, the paging information does not indicate a scheduling offset between the paging information and the data transmission.

In a sixth aspect, alone or in combination with one or more of the first through fifth aspects, a scheduling offset between the paging information and the data transmission is determined based at least in part on a time interval between the first paging occasion and the second paging occasion.

In a seventh aspect, alone or in combination with one or more of the first through sixth aspects, the first paging occasion and the second paging occasion are in different slots.

In an eighth aspect, alone or in combination with one or more of the first through seventh aspects, process 400 may include determining a resource for the data transmission in the second paging occasion based at least in part on the paging information.

In a ninth aspect, alone or in combination with one or more of the first through eighth aspects, the paging information comprises a physical downlink control channel (PDCCH) that includes downlink control information (DCI) with a cyclic redundancy check (CRC) scrambled by a paging radio network temporary identifier (P-RNTI), and the data transmission comprises a physical downlink shared channel (PDSCH) that includes comprising a paging message.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
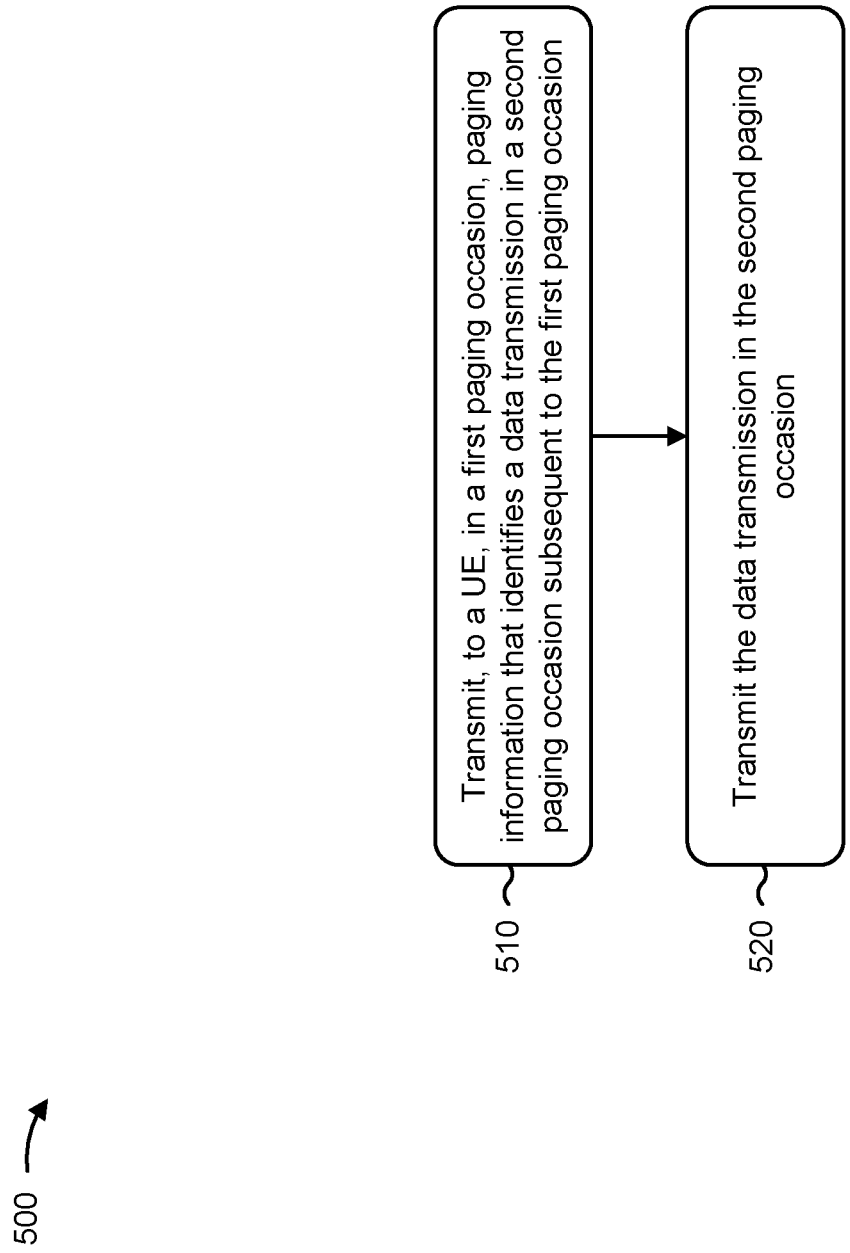

FIG. 5 is a diagram illustrating an example process 500 performed, for example, by a base station, in accordance with the present disclosure. Example process 500 is an example where the base station (e.g., BS 110 and/or the like) performs operations associated with PO sharing with cross-PO paging.

As shown in FIG. 5, in some aspects, process 500 may include transmitting, to a UE, in a first paging occasion, paging information that identifies a data transmission in a second paging occasion subsequent to the first paging occasion (block 510). For example, the base station (e.g., using controller/processor 240, transmit processor 220, TX MIMO processor 230, MOD 232, antenna 234, and/or the like) may transmit, to a UE, in a first paging occasion, paging information that identifies a data transmission in a second paging occasion subsequent to the first paging occasion, as described above.

As further shown in FIG. 5, in some aspects, process 500 may include transmitting the data transmission in the second paging occasion (block 520). For example, the base station (e.g., using controller/processor 240, transmit processor 220, TX MIMO processor 230, MOD 232, antenna 234, and/or the like) may transmit the data transmission in the second paging occasion, as described above.

Process 500 may include additional aspects, such as any single aspect or any combination of aspects described below and/or in connection with one or more other processes described elsewhere herein.

In a first aspect, transmitting the paging information in the first paging occasion and the data transmission in the second paging occasion is based at least in part on the UE being capable of cross-paging occasion paging.

In a second aspect, alone or in combination with the first aspect, the second paging occasion is consecutive with the first paging occasion in time.

In a third aspect, alone or in combination with one or more of the first and second aspects, the first paging occasion is shared by a first set of UEs incapable of cross-paging occasion paging, and the second paging occasion is shared by a second set of UEs incapable of cross-paging occasion paging.

In a fourth aspect, alone or in combination with one or more of the first through third aspects, process 500 includes transmitting, in the second paging occasion, paging information for the second set of UEs, wherein the paging information for the second is setting of UEs identifies the data transmission in the second paging occasion.

In a fifth aspect, alone or in combination with one or more of the first through fourth aspects, a set of monitoring occasions in which the paging information is received, and a data channel occasion in which the data transmission is received, are associated with a same beam configuration.

In a sixth aspect, alone or in combination with one or more of the first through fifth aspects, the beam configuration comprises at least one of a synchronization signal block configuration or a quasi-colocation configuration.

In a seventh aspect, alone or in combination with one or more of the first through sixth aspects, the paging information does not indicate a scheduling offset between the paging information and the data transmission.

In an eighth aspect, alone or in combination with one or more of the first through seventh aspects, a scheduling offset between the paging information and the data transmission is determined based at least in part on a time interval between the first paging occasion and the second paging occasion.

In a ninth aspect, alone or in combination with one or more of the first through eighth aspects, the first paging occasion and the second paging occasion are associated with different slots.

In a tenth aspect, alone or in combination with one or more of the first through ninth aspects, the paging information comprises a physical downlink control channel (PDCCH) that includes downlink control information (DCI) with a cyclic redundancy check (CRC) scrambled by a paging radio network temporary identifier (P-RNTI), and the data transmission comprises a physical downlink shared channel (PDSCH) that includes comprising a paging message.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
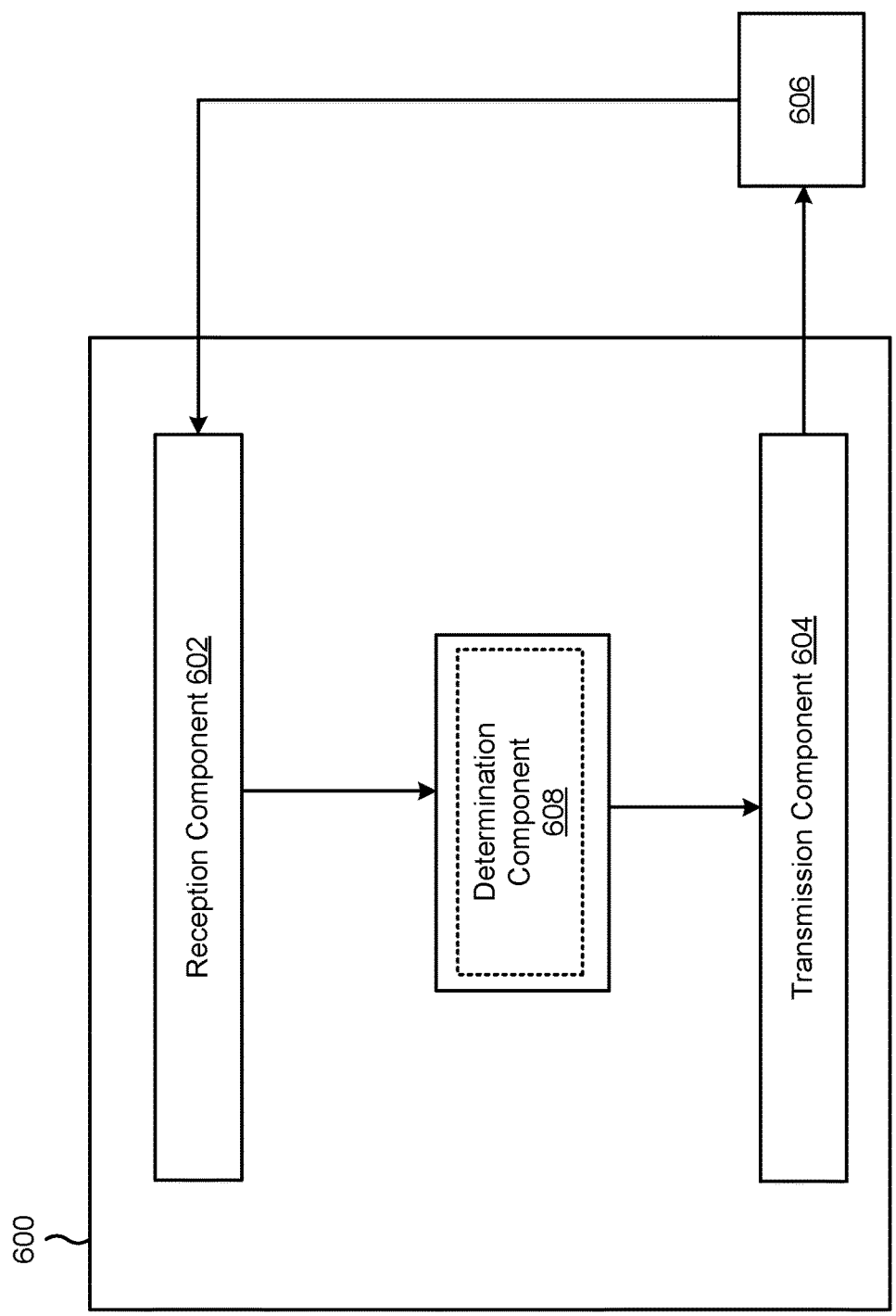
FIGS. 6-7 are block diagrams of example apparatuses for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include a determination component 608.

In some aspects, the apparatus 600 may be configured to perform one or more operations described herein in connection with FIGS. 3-5. Additionally or alternatively, the apparatus 600 may be configured to perform one or more processes described herein, such as process 400 of FIG. 4. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The reception component 602 may receive, in a first paging occasion, paging information that identifies a data transmission in a second paging occasion subsequent to the first paging occasion. The reception component 602 may also receive the data transmission during the second paging occasion. The determination component 608 may determine a resource for the data transmission in the second paging occasion based at least in part on the paging information.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally or alternatively, a set of (one or more) components shown in FIG. 6 may perform one or more functions described as being performed by another set of components shown in FIG. 6.

Figure 7:
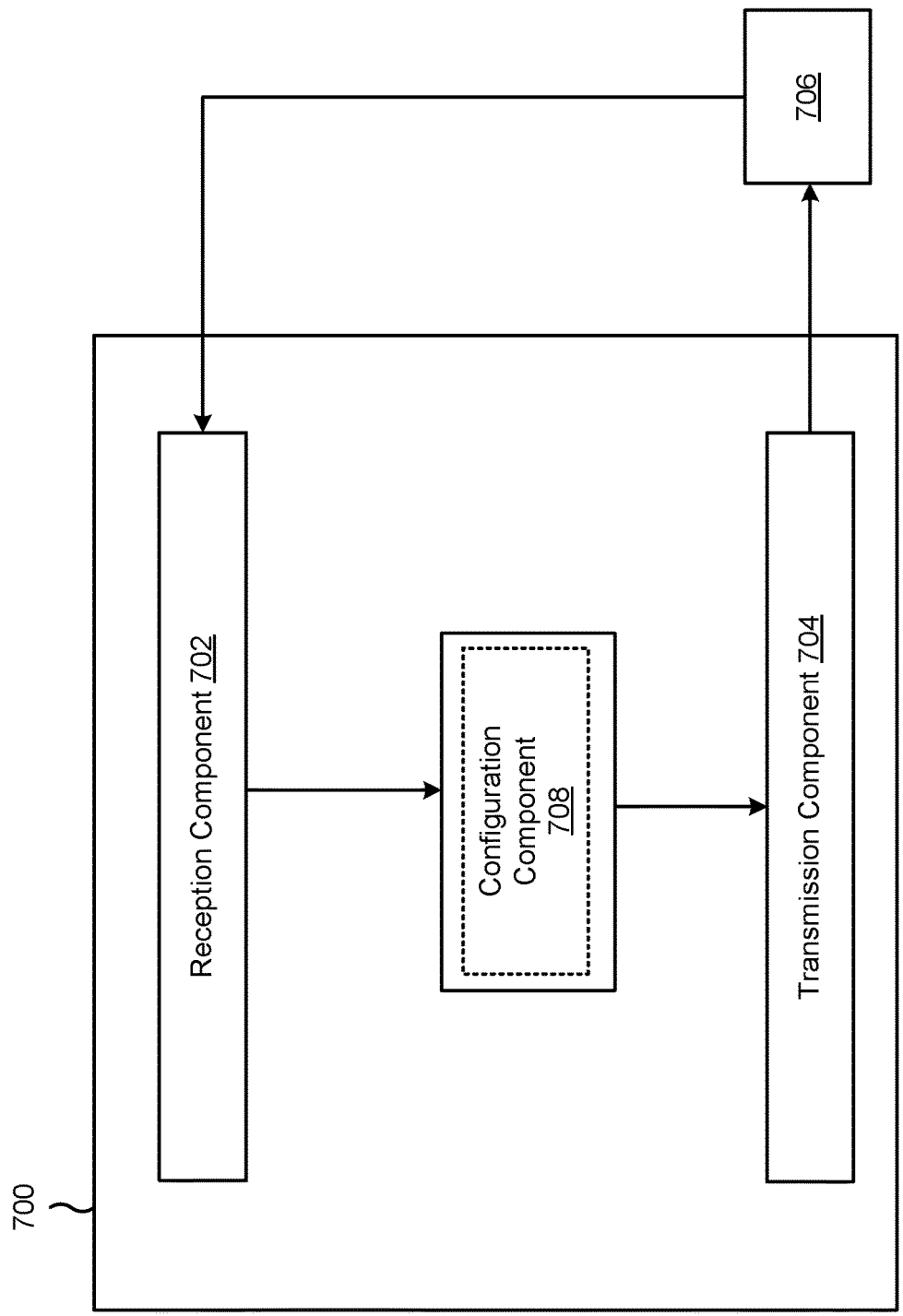

FIG. 7 is a block diagram of an example apparatus 700 for wireless communication. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, in some aspects, the apparatus 700 may include a configuration component 708.

In some aspects, the apparatus 700 may be configured to perform one or more operations described herein in connection with FIGS. 3-5. Additionally or alternatively, the apparatus 700 may be configured to perform one or more processes described herein, such as process 500 of FIG. 5. In some aspects, the apparatus 700 and/or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the base station described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the base station described above in connection with FIG. 2. In some aspects, the transmission component 704 may be co-located with the reception component 702 in a transceiver.

The configuration component 708 may configure a first paging occasion and a second paging occasion (e.g., may cause the transmission component 704 to transmit configuration information for the first paging occasion and the second paging occasion). The transmission component 704 may transmit, to a UE, in a first paging occasion, paging information that identifies a data transmission in a second paging occasion subsequent to the first paging occasion. The transmission component 704 may also transmit the data transmission in the second paging occasion. In some aspects, the transmission component 704 may transmit, in the second paging occasion, paging information for a second set of UEs, wherein the paging information for the second set of UEs identifies the data transmission in the second paging occasion.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving, in a first paging occasion, paging information that identifies a data transmission in a second paging occasion subsequent to the first paging occasion; and receiving the data transmission during the second paging occasion.

Aspect 2: The method of Aspect 1, wherein the second paging occasion is consecutive with the first paging occasion in time.

Aspect 3: The method of any of Aspects 1-2, wherein the first paging occasion is shared by a first set of UEs incapable of cross-paging occasion paging, and wherein the second paging occasion is shared by a second set of UEs incapable of cross-paging occasion paging.

Aspect 4: The method of any of Aspects 1-3, wherein a set of monitoring occasions in which the paging information is received, and a data channel occasion in which the data transmission is received, are associated with a same beam configuration.

Aspect 5: The method of Aspect 4, wherein the beam configuration comprises at least one of a synchronization signal block configuration or a quasi-colocation configuration.

Aspect 6: The method of any of Aspects 1-5, wherein the paging information does not indicate a scheduling offset between the paging information and the data transmission.

Aspect 7: The method of any of Aspects 1-6, wherein a scheduling offset between the paging information and the data transmission is determined based at least in part on a time interval between the first paging occasion and the second paging occasion.

Aspect 8: The method of any of Aspects 1-7, wherein the first paging occasion and the second paging occasion are in different slots.

Aspect 9: The method of any of Aspects 1-8, further comprising: determining a resource for the data transmission in the second paging occasion based at least in part on the paging information.

Aspect 10: The method of any of Aspects 1-9, wherein the paging information comprises a physical downlink control channel (PDCCH) that includes downlink control information (DCI) with a cyclic redundancy check (CRC) scrambled by a paging radio network temporary identifier (P-RNTI), and wherein the data transmission comprises a physical downlink shared channel (PDSCH) that includes comprising a paging message.

Aspect 11: A method of wireless communication performed by a base station, comprising: transmitting, to a user equipment (UE), in a first paging occasion, paging information that identifies a data transmission in a second paging occasion subsequent to the first paging occasion; and transmitting the data transmission in the second paging occasion.

Aspect 12: The method of Aspect 11, wherein transmitting the paging information in the first paging occasion and the data transmission in the second paging occasion is based at least in part on the UE being capable of cross-paging occasion paging.

Aspect 13: The method of any of Aspects 11-12, wherein the second paging occasion is consecutive with the first paging occasion in time.

Aspect 14: The method of any of Aspects 11-13, wherein the first paging occasion is shared by a first set of UEs incapable of cross-paging occasion paging, and wherein the second paging occasion is shared by a second set of UEs incapable of cross-paging occasion paging.

Aspect 15: The method of Aspect 14, further comprising: transmitting, in the second paging occasion, paging information for the second set of UEs, wherein the paging information for the second set of UEs identifies the data transmission in the second paging occasion.

Aspect 16: The method of any of Aspects 11-15, wherein a set of monitoring occasions in which the paging information is received, and a data channel occasion in which the data transmission is received, are associated with a same beam configuration.

Aspect 17: The method of Aspect 16, wherein the beam configuration comprises at least one of a synchronization signal block configuration or a quasi-colocation configuration.

Aspect 18: The method of any of Aspects 11-17, wherein the paging information does not indicate a scheduling offset between the paging information and the data transmission.

Aspect 19: The method of any of Aspects 11-18, wherein a scheduling offset between the paging information and the data transmission is determined based at least in part on a time interval between the first paging occasion and the second paging occasion.

Aspect 20: The method of any of Aspects 11-19, wherein the first paging occasion and the second paging occasion are associated with different slots.

Aspect 21: The method of any of Aspects 11-20, wherein the paging information comprises a physical downlink control channel (PDCCH) that includes downlink control information (DCI) with a cyclic redundancy check (CRC) scrambled by a paging radio network temporary identifier (P-RNTI), and wherein the data transmission comprises a physical downlink shared channel (PDSCH) that includes comprising a paging message.

Aspect 22: An apparatus for wireless communication at a device, comprising: a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
a memory; and
one or more processors, coupled to the memory, configured to:
receive, in a first paging occasion, paging information that identifies a data transmission in a second paging occasion subsequent to the first paging occasion; and
receive the data transmission during the second paging occasion, wherein:
the first paging occasion is shared by a first set of UEs incapable of cross-paging occasion paging and the second paging occasion is shared by a second set of UEs incapable of cross-paging occasion paging;
a scheduling offset between the paging information and the data transmission is not indicated by the paging information or is based at least in part on a time interval between the first paging occasion and the second paging occasion; or
the one or more processors are further configured to determine a resource for the data transmission in the second paging occasion based at least in part on the paging information.

2. The apparatus of claim 1, wherein the second paging occasion is consecutive with the first paging occasion in time.

3. The apparatus of claim 1, wherein the first paging occasion is shared by the first set of UEs incapable of cross-paging occasion paging, and wherein the second paging occasion is shared by the second set of UEs incapable of cross-paging occasion paging.

4. The apparatus of claim 1, wherein a set of monitoring occasions in which the paging information is received, and a data channel occasion in which the data transmission is received, are associated with a same beam configuration.

5. The apparatus of claim 4, wherein the beam configuration comprises at least one of a synchronization signal block configuration or a quasi-colocation configuration.

6. The apparatus of claim 1, wherein the scheduling offset between the paging information and the data transmission is not indicated by the paging information.

7. The apparatus of claim 1, wherein the scheduling offset between the paging information and the data transmission is based at least in part on the time interval between the first paging occasion and the second paging occasion.

8. The apparatus of claim 1, wherein the first paging occasion and the second paging occasion are in different slots.

9. The apparatus of claim 1, wherein the one or more processors are configured to:
determine the resource for the data transmission in the second paging occasion based at least in part on the paging information.

10. The apparatus of claim 1, wherein the paging information comprises a physical downlink control channel (PDCCH) that includes downlink control information (DCI) with a cyclic redundancy check (CRC) scrambled by a paging radio network temporary identifier (P-RNTI), and wherein the data transmission comprises a physical downlink shared channel (PDSCH) that includes a paging message.

11. An apparatus for wireless communication, comprising:
a memory; and
one or more processors, coupled to the memory, configured to:
transmit, to a user equipment (UE) in a first paging occasion, paging information that identifies a data transmission in a second paging occasion subsequent to the first paging occasion; and
transmit the data transmission in the second paging occasion, wherein:
the first paging occasion is shared by a first set of UEs incapable of cross-paging occasion paging and the second paging occasion is shared by a second set of UEs incapable of cross-paging occasion paging; or
a scheduling offset between the paging information and the data transmission is not indicated by the paging information or is based at least in part on a time interval between the first paging occasion and the second paging occasion.

12. The apparatus of claim 11, wherein transmission of the paging information in the first paging occasion and the data transmission in the second paging occasion is based at least in part on the UE being capable of cross-paging occasion paging.

13. The apparatus of claim 11, wherein the second paging occasion is consecutive with the first paging occasion in time.

14. The apparatus of claim 11, wherein the first paging occasion is shared by the first set of UEs incapable of cross-paging occasion paging, and wherein the second paging occasion is shared by the second set of UEs incapable of cross-paging occasion paging.

15. The apparatus of claim 14, wherein the one or more processors are further configured to:
transmit, in the second paging occasion, paging information for the second set of UEs, wherein the paging information for the second set of UEs identifies the data transmission in the second paging occasion.

16. The apparatus of claim 11, wherein a set of monitoring occasions in which the paging information is received, and a data channel occasion in which the data transmission is received, are associated with a same beam configuration.

17. The apparatus of claim 16, wherein the beam configuration comprises at least one of a synchronization signal block configuration or a quasi-colocation configuration.

18. The apparatus of claim 11, wherein the scheduling offset between the paging information and the data transmission is not indicated by the paging information.

19. The apparatus of claim 11, wherein the scheduling offset between the paging information and the data transmission is based at least in part on the time interval between the first paging occasion and the second paging occasion.

20. The apparatus of claim 11, wherein the first paging occasion and the second paging occasion are associated with different slots.

21. The apparatus of claim 11, wherein the paging information comprises a physical downlink control channel (PDCCH) that includes downlink control information (DCI) with a cyclic redundancy check (CRC) scrambled by a paging radio network temporary identifier (P-RNTI), and wherein the data transmission comprises a physical downlink shared channel (PDSCH) that includes a paging message.

22. A method of wireless communication performed by a user equipment (UE), comprising:
receiving, in a first paging occasion, paging information that identifies a data transmission in a second paging occasion subsequent to the first paging occasion; and
receiving the data transmission during the second paging occasion, wherein:
the first paging occasion is shared by a first set of UEs incapable of cross-paging occasion paging and the second paging occasion is shared by a second set of UEs incapable of cross-paging occasion paging;
a scheduling offset between the paging information and the data transmission is not indicated by the paging information or is based at least in part on a time interval between the first paging occasion and the second paging occasion; or
the method further comprises determining a resource for the data transmission in the second paging occasion based at least in part on the paging information.

23. The method of claim 22, wherein the second paging occasion is consecutive with the first paging occasion in time.

24. The method of claim 22, wherein the first paging occasion is shared by the first set of UEs incapable of cross-paging occasion paging, and wherein the second paging occasion is shared by the second set of UEs incapable of cross-paging occasion paging.

25. The method of claim 22, wherein a set of monitoring occasions in which the paging information is received, and a data channel occasion in which the data transmission is received, are associated with a same beam configuration.

26. The method of claim 22, wherein the scheduling offset between the paging information and the data transmission is not indicated by the paging information.

27. The method of claim 22, wherein the scheduling offset between the paging information and the data transmission is based at least in part on the time interval between the first paging occasion and the second paging occasion.

28. The method of claim 22, comprising determining the resource for the data transmission in the second paging occasion based at least in part on the paging information.

29. A method of wireless communication performed by a base station, comprising:
transmitting, to a user equipment (UE), in a first paging occasion, paging information that identifies a data transmission in a second paging occasion subsequent to the first paging occasion; and
transmitting the data transmission in the second paging occasion, wherein:
the first paging occasion is shared by a first set of UEs incapable of cross-paging occasion paging and the second paging occasion is shared by a second set of UEs incapable of cross-paging occasion paging; or
a scheduling offset between the paging information and the data transmission is not indicated by the paging information or is based at least in part on a time interval between the first paging occasion and the second paging occasion.

30. The method of claim 29, wherein transmission of the paging information in the first paging occasion and the data transmission in the second paging occasion is based at least in part on the UE being capable of cross-paging occasion paging.

31. The method of claim 29, wherein the second paging occasion is consecutive with the first paging occasion in time.

32. The method of claim 29, wherein the first paging occasion is shared by the first set of UEs incapable of cross-paging occasion paging, and wherein the second paging occasion is shared by the second set of UEs incapable of cross-paging occasion paging.

33. The method of claim 32, further comprising:
transmitting, in the second paging occasion, paging information for the second set of UEs, wherein the paging information for the second set of UEs identifies the data transmission in the second paging occasion.

34. The method of claim 29, wherein the scheduling offset between the paging information and the data transmission is not indicated by the paging information.

35. The method of claim 29, wherein the scheduling offset between the paging information and the data transmission is based at least in part on the time interval between the first paging occasion and the second paging occasion.

* * * * *